United States Patent
Fan et al.

(10) Patent No.: US 8,230,090 B2
(45) Date of Patent: Jul. 24, 2012

(54) SYSTEM AND METHOD FOR TCP OFFLOADING AND UPLOADING

(75) Inventors: Kan Frankie Fan, Diamond Bar, CA (US); Scott S. McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 3181 days.

(21) Appl. No.: 10/298,817

(22) Filed: Nov. 18, 2002

(65) Prior Publication Data
US 2004/0049591 A1 Mar. 11, 2004

Related U.S. Application Data

(60) Provisional application No. 60/410,022, filed on Sep. 11, 2002.

(51) Int. Cl.
*G06F 13/00* (2006.01)
(52) U.S. Cl. .................................. 709/230; 709/232
(58) Field of Classification Search ........... 709/230–232
See application file for complete search history.

(56) References Cited

U.S. PATENT DOCUMENTS

| | | | |
|---|---|---|---|
| 6,247,060 B1 * | 6/2001 | Boucher et al. ............... 709/238 |
| 6,334,155 B1 * | 12/2001 | Long et al. .................... 709/250 |
| 6,427,171 B1 | 7/2002 | Craft et al. |
| 6,490,615 B1 * | 12/2002 | Dias et al. ..................... 709/219 |
| 6,587,884 B1 * | 7/2003 | Papadopoulos et al. ...... 709/230 |
| 6,591,302 B2 * | 7/2003 | Boucher et al. ............... 709/230 |
| 6,965,941 B2 * | 11/2005 | Boucher et al. ............... 709/230 |
| 7,089,293 B2 * | 8/2006 | Grosner et al. ................ 709/217 |
| 7,089,326 B2 * | 8/2006 | Boucher et al. ............... 709/242 |
| 7,191,241 B2 * | 3/2007 | Boucher et al. ............... 709/230 |
| 7,237,036 B2 * | 6/2007 | Boucher et al. ............... 709/245 |
| 7,934,021 B2 * | 4/2011 | Elzur et al. .................... 709/250 |
| 2001/0037397 A1 | 11/2001 | Boucher et al. |
| 2004/0010545 A1 * | 1/2004 | Pandya .......................... 709/203 |
| 2004/0019689 A1 * | 1/2004 | Fan ................................ 709/230 |
| 2004/0062267 A1 * | 4/2004 | Minami et al. ................ 370/463 |
| 2004/0064589 A1 * | 4/2004 | Boucher et al. ............... 709/250 |

OTHER PUBLICATIONS

Andrew S. TAnenbaum; Structured Computer Organization (Second Edition); pp. 10-12; 1984.*

* cited by examiner

*Primary Examiner* — Kenneth R Coulter
(74) *Attorney, Agent, or Firm* — Thomas, Kayden, Horstemeyer & Risley LLP.

(57) ABSTRACT

Systems and methods that provide transmission control protocol (TCP) offloading and uploading are provided. In one example, a multiple stack system may include a software stack and a hardware stack. The software stack may be adapted to process a first set of TCP packet streams. The hardware stack may be adapted to process a second set of TCP packet streams and may be coupled to the software stack. The software stack may be adapted to offload one or more TCP connections to the hardware stack. The hardware stack may be adapted to upload one or more TCP connections to the software stack. The software stack and the hardware stack may process one or more TCP connections concurrently.

28 Claims, 8 Drawing Sheets

SYSTEM AND METHOD FOR TCP OFFLOADING AND UPLOADING

RELATED APPLICATION

This application makes reference to, claims priority to and claims benefit from U.S. Provisional Patent Application Ser. No. 60/410,022, entitled "System and Method for TCP Offloading and Uploading," filed on Sep. 11, 2002.

INCORPORATION BY REFERENCE

The above-reference United States patent application is hereby incorporated herein by reference in its entirety.

BACKGROUND OF THE INVENTION

FIG. 1 shows a block diagram of a conventional software TCP stack 10. The conventional software TCP stack 10 includes a layer 2 (L2) network adapter 20, an L2 network interface driver 30 and a monolithic software stack 40. An Ethernet TCP/IP network is coupled to the L2 network adapter 20, which, in turn, is coupled to the L2 network interface driver 30. The L2 network interface driver 30 is coupled to the monolithic software stack 40, which, in turn, is coupled to the sockets interface. This implementation of the TCP stack may suffer from the significant consumption of CPU processing time and memory bandwidth and may require a substantial amount of memory. As network speeds continue to increase, the memory bandwidth, in particular, may become a bottleneck for the software TCP stack 10. For example, each byte of data may be read or written five times during its processing.

FIG. 2 shows a block diagram of a conventional hardware TCP stack 50. The conventional hardware TCP stack 50 includes a monolithic hardware stack 60 and an L4 network interface driver 70. The Ethernet TCP/IP network is coupled to the monolithic hardware stack 60. The monolithic hardware stack 60 is coupled to the L4 network interface driver 70, which, in turn, is coupled to the sockets interface. In the implementation of an offloaded TCP stack, all the code from the software stack is moved to the hardware adapter. The hardware stack 50 may also suffer since a large amount of memory must be reserved on the hardware adapter to handle all the data that the stack has promised to take. A rough estimate of the memory size may be ascertained by multiplying the TCP window size by the number of connections. Another problem with the hardware implementation is that the full TCP stack, as implemented by the software stack, must be done in the hardware stack, thereby increasing code size and decreasing performance.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found in, for example, systems and methods that provide transmission control protocol (TCP) offloading and uploading. In one embodiment, the present invention may provide a multiple stack system including a software stack and a hardware stack. The software stack may be adapted to process a first set of TCP packet streams. The hardware stack may be adapted to process a second set of TCP packet streams and may be coupled to the software stack. The software stack may be adapted to offload one or more TCP connections to the hardware stack. The hardware stack may be adapted to upload one or more TCP connections to the software stack. The software stack and the hardware stack may process one or more TCP connections concurrently.

In another embodiment, the present invention may provide a method that offloads and uploads in a multiple stack system. The method may include one or more of the following: processing one or more TCP connections on a software stack; processing one or more TCP connections on a hardware stack, the processing of the hardware stack occurring concurrently with the processing of the software stack; offloading a first TCP connection from the software stack to the hardware stack; and uploading a second TCP connection from the hardware stack to the software stack.

These and other features and advantages of the present invention may be appreciated from a review of the following detailed description of the present invention, along with the accompanying figures in which like reference numerals refer to like parts throughout.

DETAILED DESCRIPTION OF THE INVENTION

One or more of the embodiments according to the present invention may provide for a multiple stack environment in which a portion of a first stack may be run, in parallel, with a second stack. Some connections may be offloaded and uploaded on the fly between the first stack and the second stack.

Figure 1:
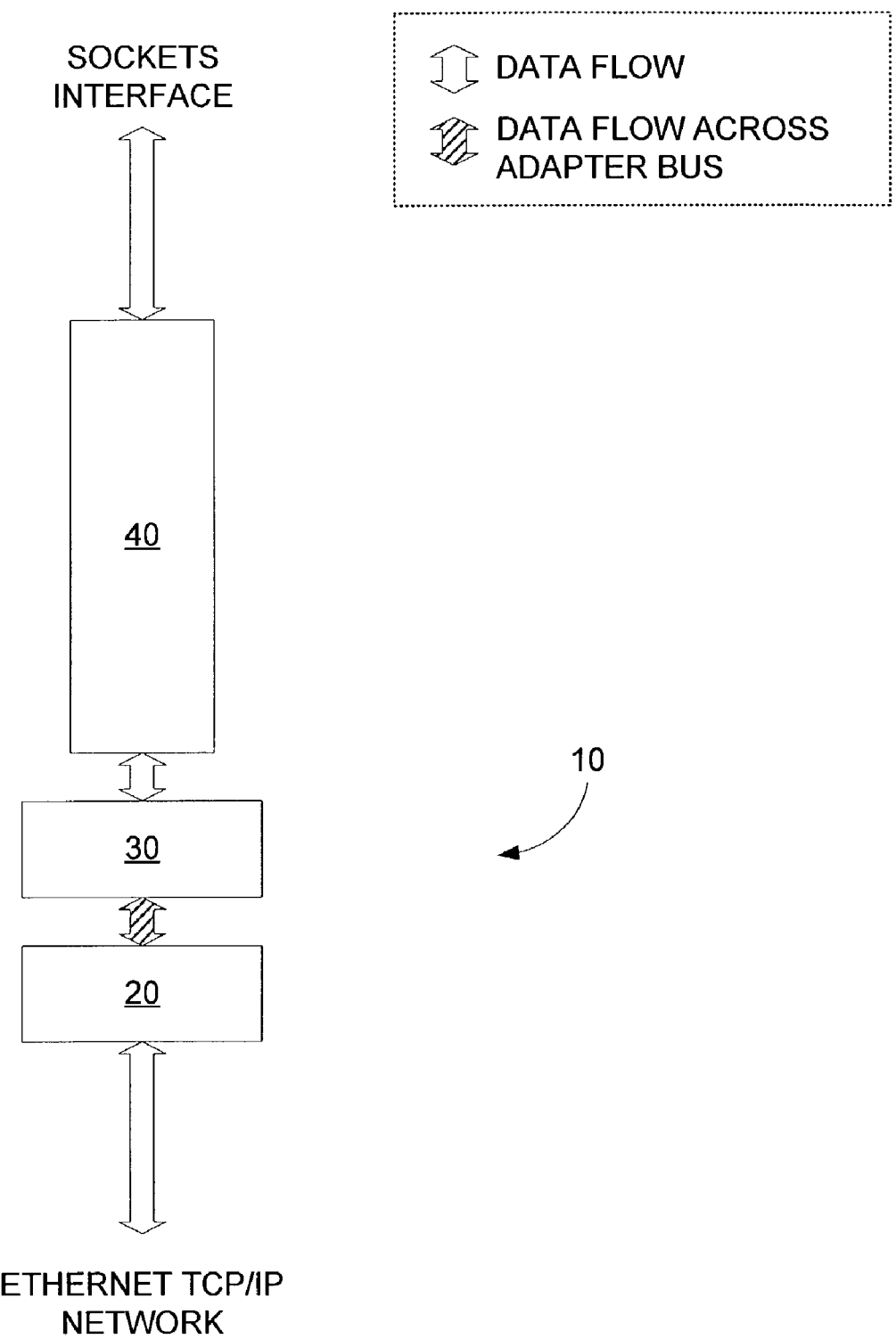
FIG. 1 shows a block diagram of a conventional software TCP stack.
Figure 2:
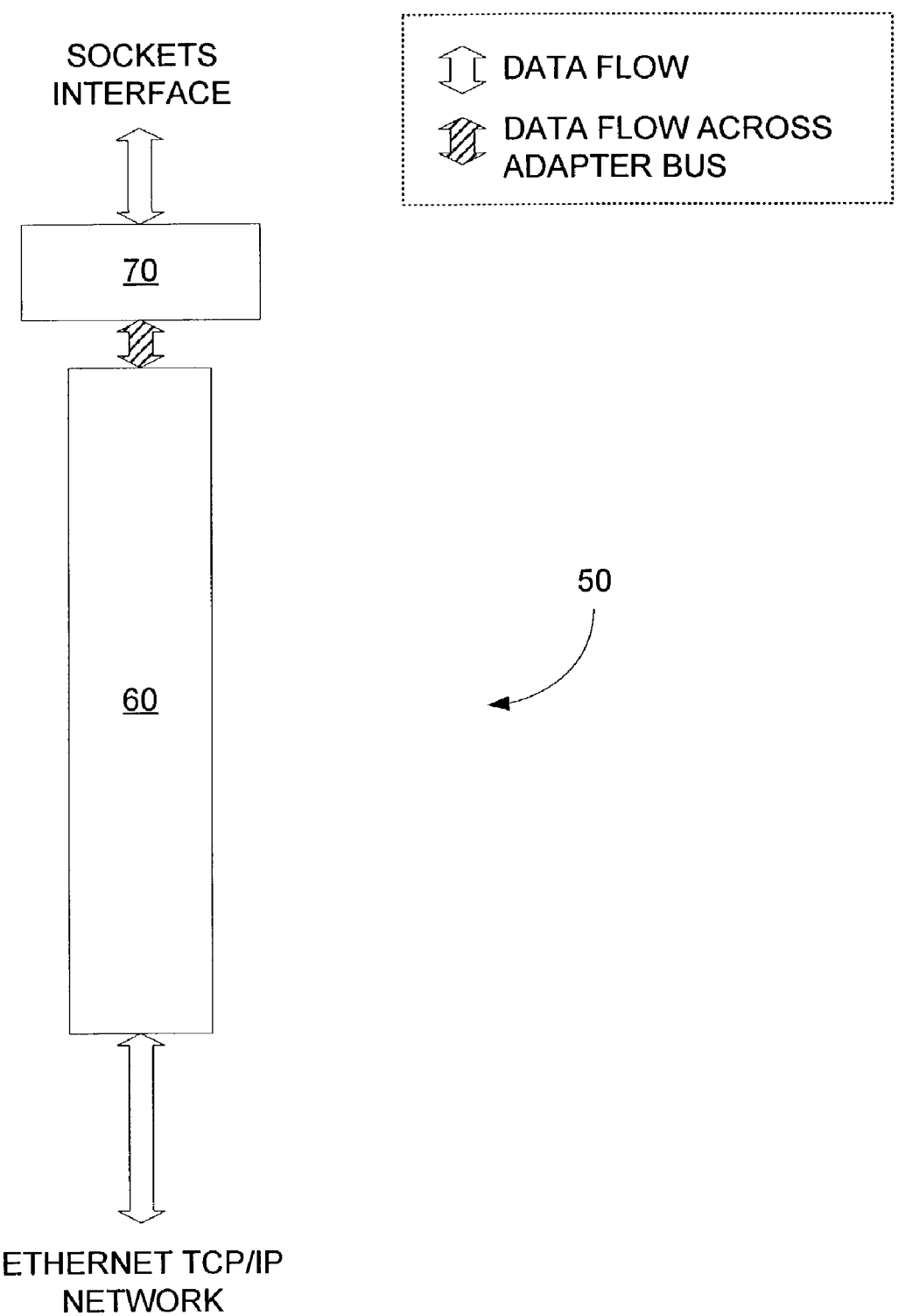
FIG. 2 shows a block diagram of a conventional hardware TCP stack.
Figure 3:
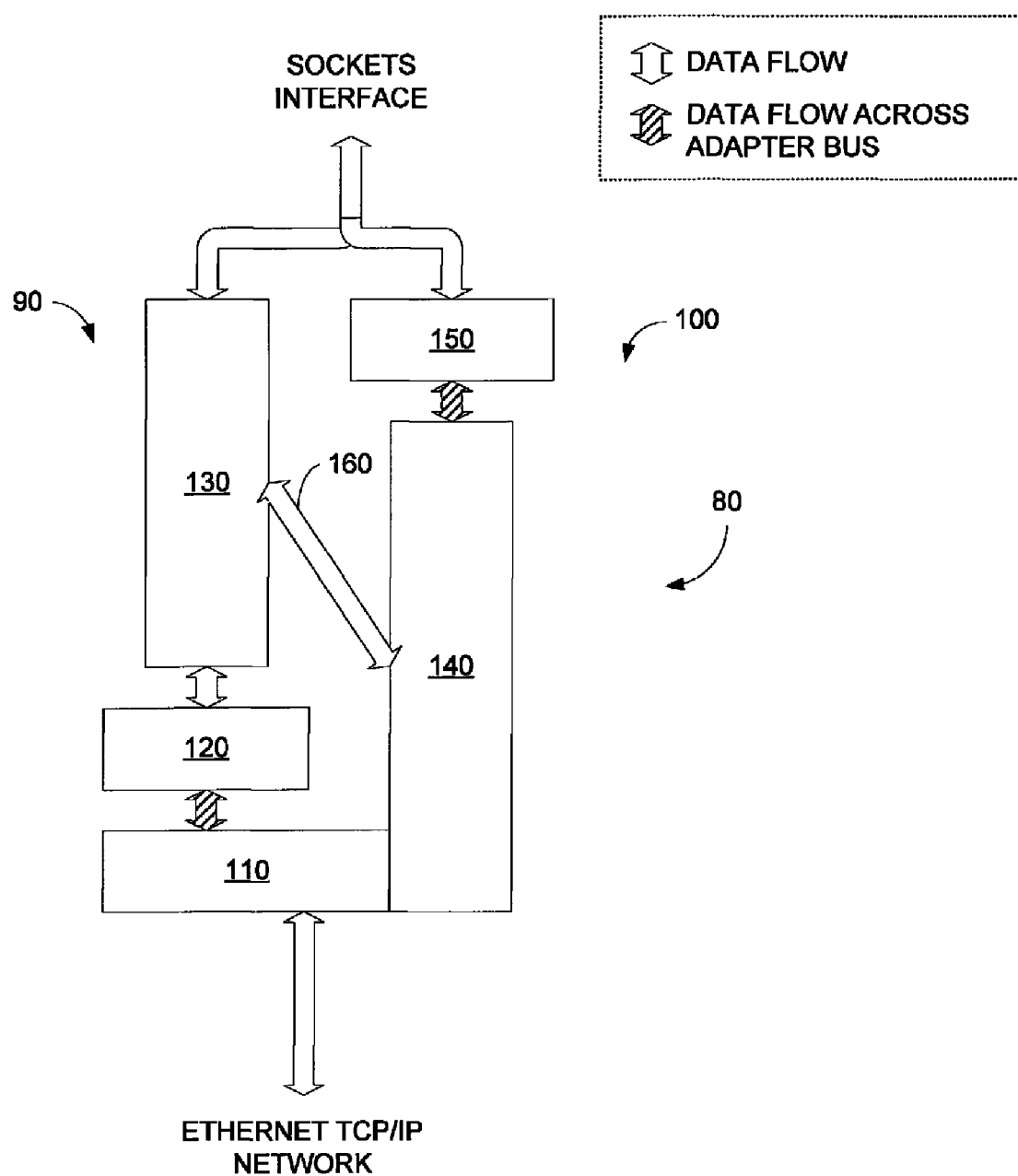
FIG. 3 shows an embodiment of a multiple stack system according to the present invention.

FIG. 3 shows an embodiment of a multiple stack system according to the present invention. The multiple stack system may include, for example, a dual stack system 80. The dual stack system 80 may include, for example, a software stack 90 and a hardware stack 100. The dual stack system 80 may also include, for example, a path 160 that may be used to offload and/or to upload signaling between the software stack 90 and the hardware stack 100. The software stack 90 may include, for example, an L2 network adapter 110, an L2 network interface driver 120 and a full stack implementation 130. The Ethernet TCP/IP network may be coupled to the L2 network adapter 110, which, in turn, may be coupled to the L2 network interface driver 120. The L2 network interface driver 120 may be coupled to the full stack implementation 130, which, in turn, may be coupled to the sockets interface. The hardware stack 100 may include, for example, an accelerated partial stack implementation 140 and an L4 network interface driver 150. The accelerated partial stack implementation 140, for example, may include its own L2 network adapter, may be integrated, at least in least in part, with the L2 network adapter 110 or may be coupled to the L2 network adapter 110. The Ethernet TCP/IP network may be coupled to the accelerated partial stack implementation 140 possibly via an L2 network adapter. The accelerated partial stack implementation 140 may be coupled to the L4 network interface driver 150, which, in turn, may be coupled to the sockets interface.

Figure 4:
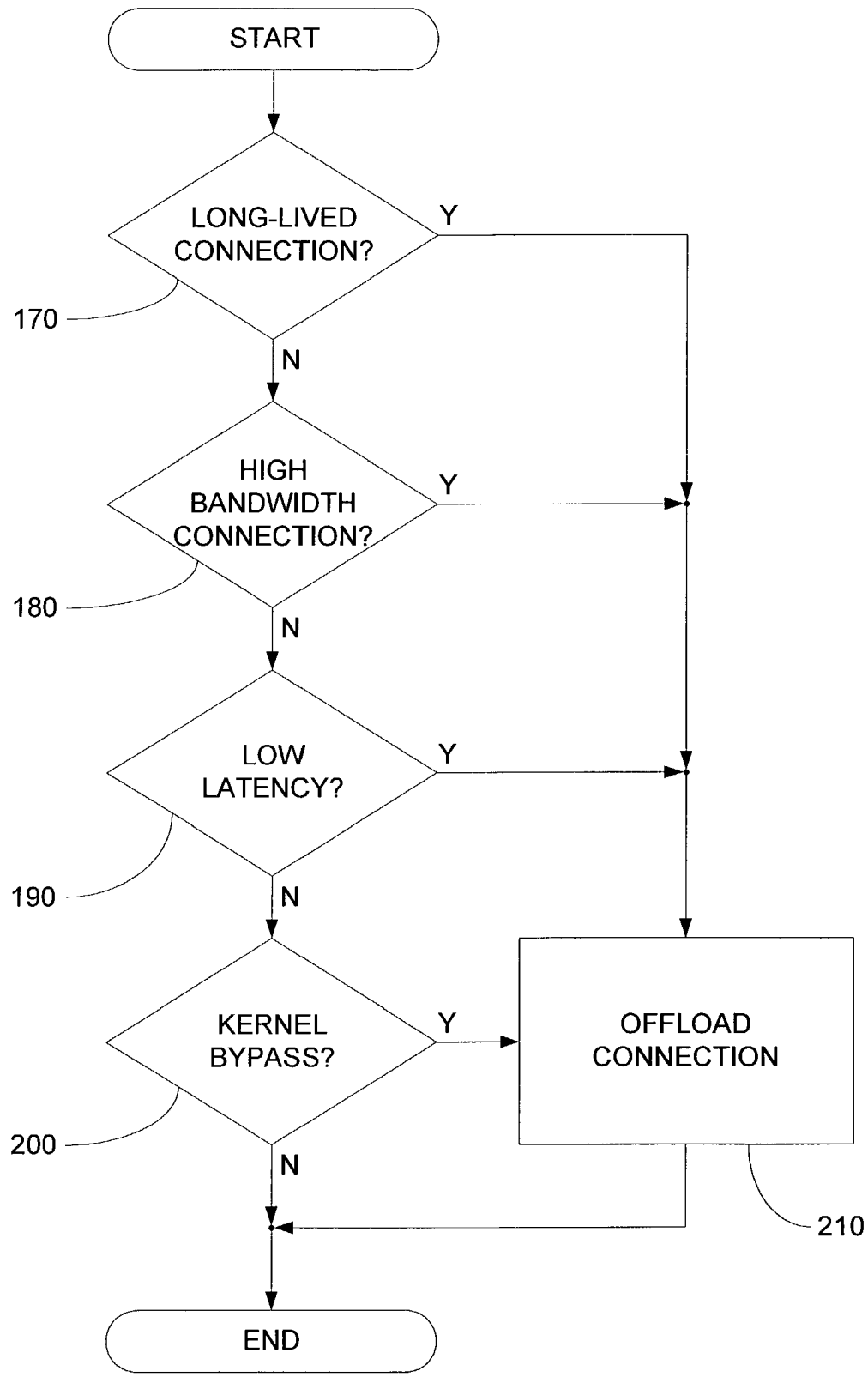
FIG. 4 shows a flow chart illustrating an embodiment of a process that determines whether to offload a connection according to the present invention.

FIG. 4 shows a flow chart illustrating an embodiment of a process that determines whether to offload a connection according to the present invention. In query 170, it may be determined whether a connection is long-lived. In one example, whether a connection is long-lived may be determined from a port number of the established link. Some port numbers are well known and reserved for particular types of connections. Furthermore, system administrator "hints" may be set to assist with the determination whether the connection is a long-lived connection. If, from the port number, it is determined that the connection is long-lived, then the process, in step 210, may offload the connection or may designate the connection for offloading, for example, from the software stack 90 to the hardware stack 100. The process is then complete. The connection may also be determined to be long-lived if the connection has been established for a long period of time. On the other hand, if it is determined that the connection is not long-lived (e.g., the port number indicates an HTTP connection), then, in query 180, it may be determined whether the connection is a high bandwidth connection. A connection in the software stack 90 that may be moving a large amount of traffic should be designated for download. Past network usage may be a useful indicator for future network usage of the connection. If the connection is a high bandwidth connection, then, in step 210, the connection may be offloaded or may be designated for offload. If the connection is not a high bandwidth connection, then, in query 190, it may be determined whether the connection desires low latency. Well-known numbers (e.g., port numbers, etc.) or other hints may be used to determine whether a particular connection may benefit from or may desire a low latency connection. An offload adapter may provide lower latency than a software stack. If low latency is desired, then, in step 210, the connection may be offloaded or may be designated for offload. If low latency is not desired, then, in query 200, it may be determined whether the connection may bypass the kernel. Some connections may be established through, for example, an application interface other than the standard sockets interface. The use of different application interfaces may be easily detected. If the kernel can be bypassed, then, in step 210, the connection may be offloaded or may be designated for offload. In one example, the application may use a higher level of offload beyond the normal TCP (sockets) connections. If the kernel cannot be bypassed, then the process ends. The queries 170-200 are merely examples of factors that may be considered in determining whether a connection should be offloaded or designated for offload. Other factors may be considered in addition to or instead of one or more of the above-described considerations.

Although the flow charts described herein illustrate embodiments with a particular order of steps or queries, the present invention is not so limited in scope. Thus, the steps or queries may be rearranged in order and steps or queries may be added or removed. Furthermore, one or more steps or queries may be performed in parallel or concurrently.

Figure 5:
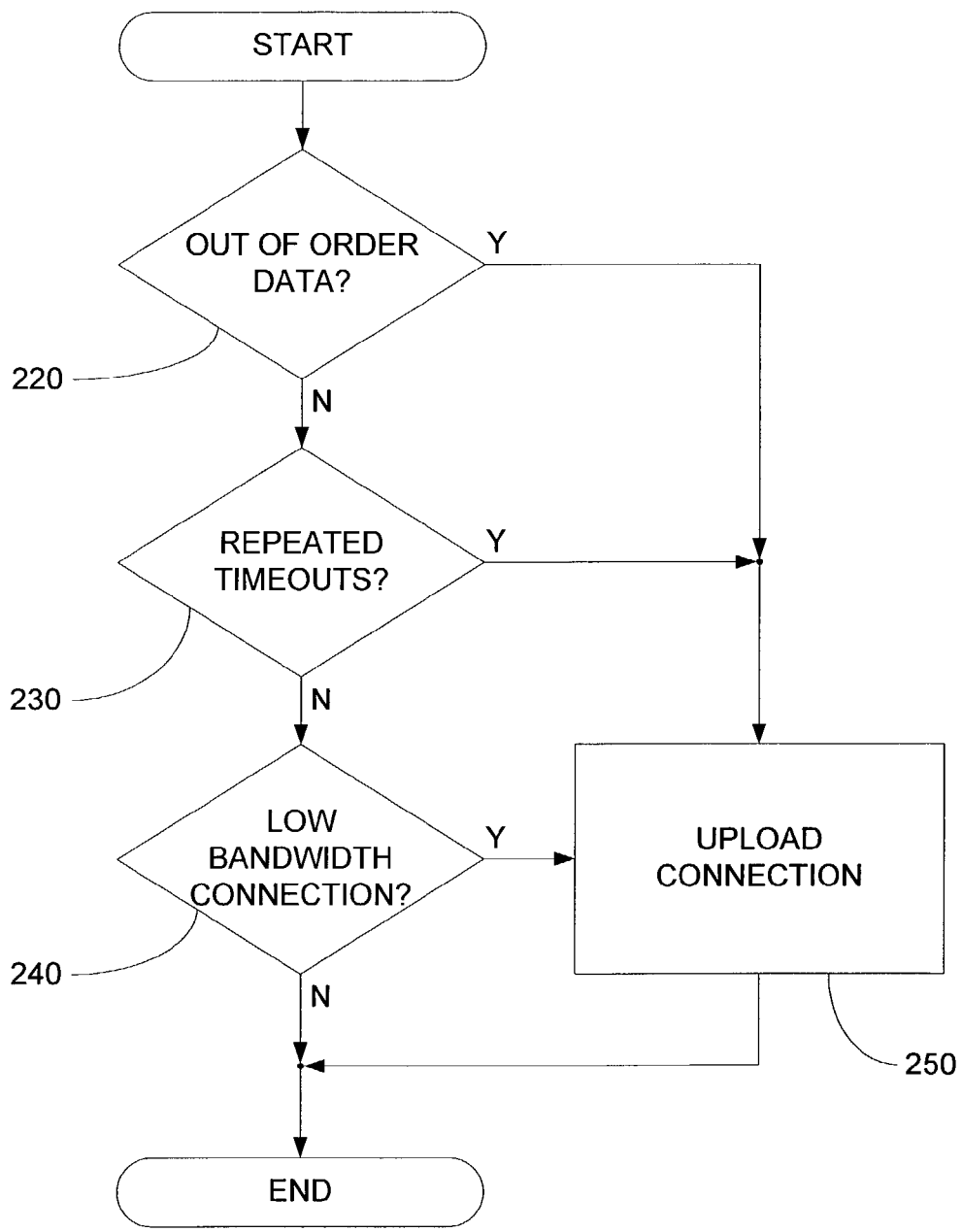
FIG. 5 shows a flow chart illustrating an embodiment of a process that determines whether to upload a connection according to the present invention.

FIG. 5 shows a flow chart illustrating an embodiment of a process that determines whether to upload a connection according to the present invention. In query 220, it may be determined whether data received from the wire is out of order for the connection. Out-of-order data may need additional work and may use up substantial adapter resources. If a particular connection is persistently out of order, then, in step 250, the connection may be uploaded or designated for upload, for example, from hardware stack 100 to software stack 90. If the particular connection is not out of order, then, in query 230, it may be determined whether repeated timeouts occur. A connection that times out repeatedly may not need high performance and should be uploaded. If the connection repeatedly times out, then, in step 250, the connection may be uploaded or may be designated for upload. If the connection does not repeatedly time out, then, in query 240, it may be determined whether the connection is a low bandwidth connection. Connections that are not moving large amounts of data may not efficiently be using the resources of the adapter. Accordingly, low bandwidth connections should be uploaded or designated for upload. If the connection is a low bandwidth connection, then, in step 250, the connection may be uploaded or designated for upload. If the connection is not a low bandwidth connection, then the process may be complete. In one embodiment, the connection may thus remain offloaded. The queries 220-240 are merely examples of factors that may be considered in determining whether a connection should be uploaded or designated for upload. Other factors may be considered in addition to or instead of one or more of the above-described considerations.

Figure 6A:
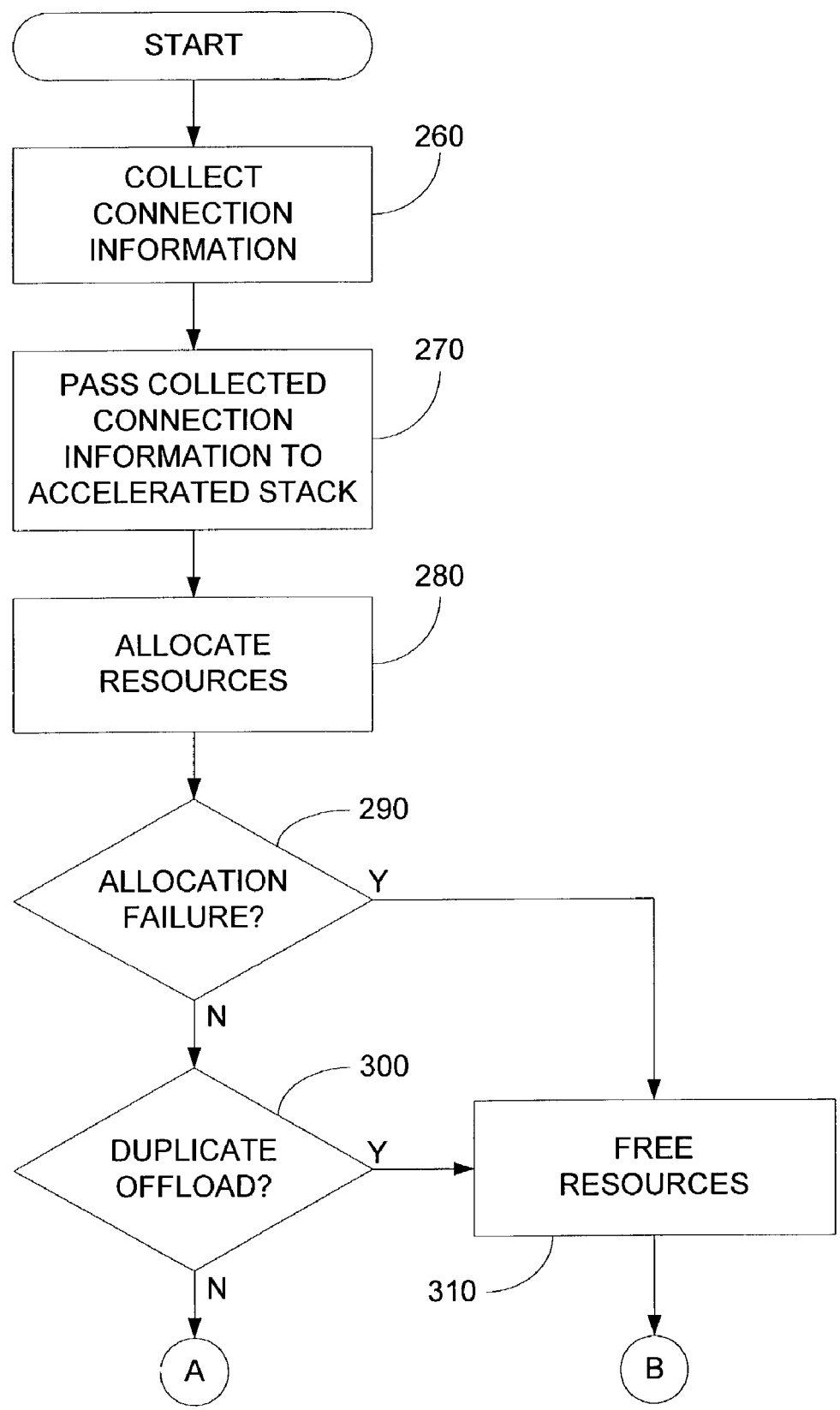
FIGS. 6A-B show a flow chart illustrating an embodiment of a process that offloads a connection according to the present invention.
Figure 6B:
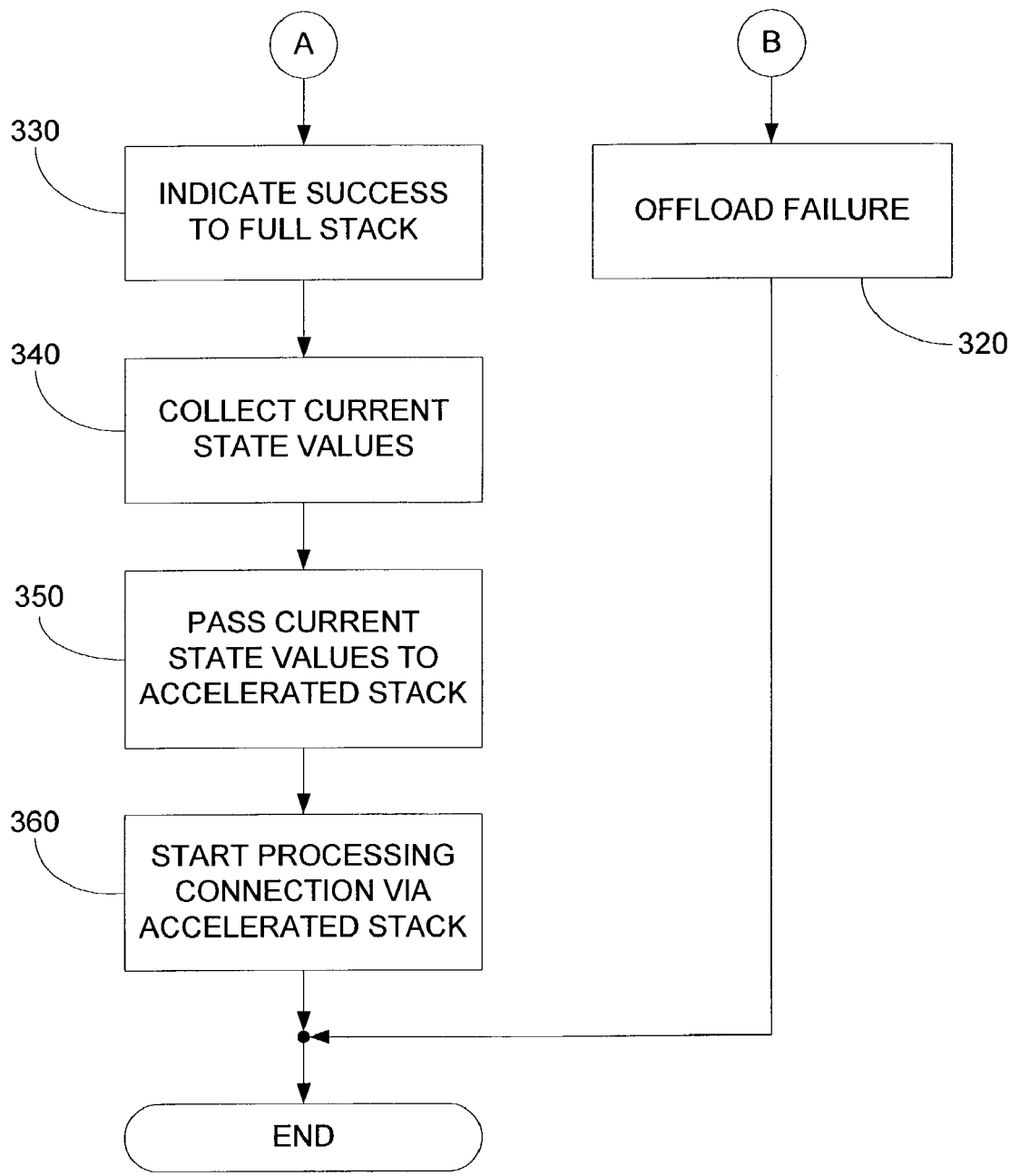

The decision to offload a connection may be made by, for example, the software stack 90 or a user application. Once the decision to offload has been made, a process that offloads the connection may be initiated according to the present invention. An embodiment of the process that offloads the connection is illustrated in FIGS. 6A-B. In step 260, connection information may be collected. In one example, the full stack implementation 130 of the software stack 90 may collect information about the connection including, for example, connection variables, states and settings. The collected information may include details such as, for example, IP addresses, TCP ports, window sizes, etc. In step 270, the collected connection information may be passed to the accelerated partial stack implementation 140 via, for example, the path 160. In step 280, resources in the accelerated partial stack implementation 140 may be allocated by the accelerated partial stack implementation 140. The received information including, for example, the collected connection variables may be checked and, based upon the check, storage and other resources may be set aside for the connection. Static information about the connection may be saved in the accelerated partial stack resources. In query 290, it may be determined whether an allocation failure has occurred. An allocation failure may occur, for example, if the required resources are unavailable for allocation. If an allocation failure occurs, then, in step 310, the accelerated partial stack implementation 140 may free the resources that may have been allocated to the connection. In step 320, an offload failure may occur and the process may be complete. In one example, the accelerated partial stack implementation 140 may notify the full stack implementation 130 or the full stack implementation 130 may determine that an offload failure has occurred. If an allocation failure does not occur, then, in query 300, it may be determined whether a duplicate offload or some other error condition has occurred. If a duplicate offload or some other error condition has occurred, then the process may jump to steps 310 and 320 as described above. If a duplicate offload or some other error condition has not occurred, then, in step 330, the full stack implementation 130 is informed of the successful resource allocation and the lack of a duplicate offload or some other error condition. In step 340, the full stack implementation 130 may collect current state values (e.g., sequence numbers, etc.) of the connection. In one embodiment, once the current state values have been collected, the software stack 90 (e.g., the full stack implementation 140) may stop processing the connection. In step 350, the full stack implementation 130 may pass the current state values of the connection to the accelerated partial stack implementation 140. The current state values of the connection may be loaded into the accelerated partial stack implementation 140. In one example, at this point the connection is offloaded. In step 360, the hardware stack 100 (e.g., the accelerated partial stack implementation 140) may begin processing the connection.

Figure 7:
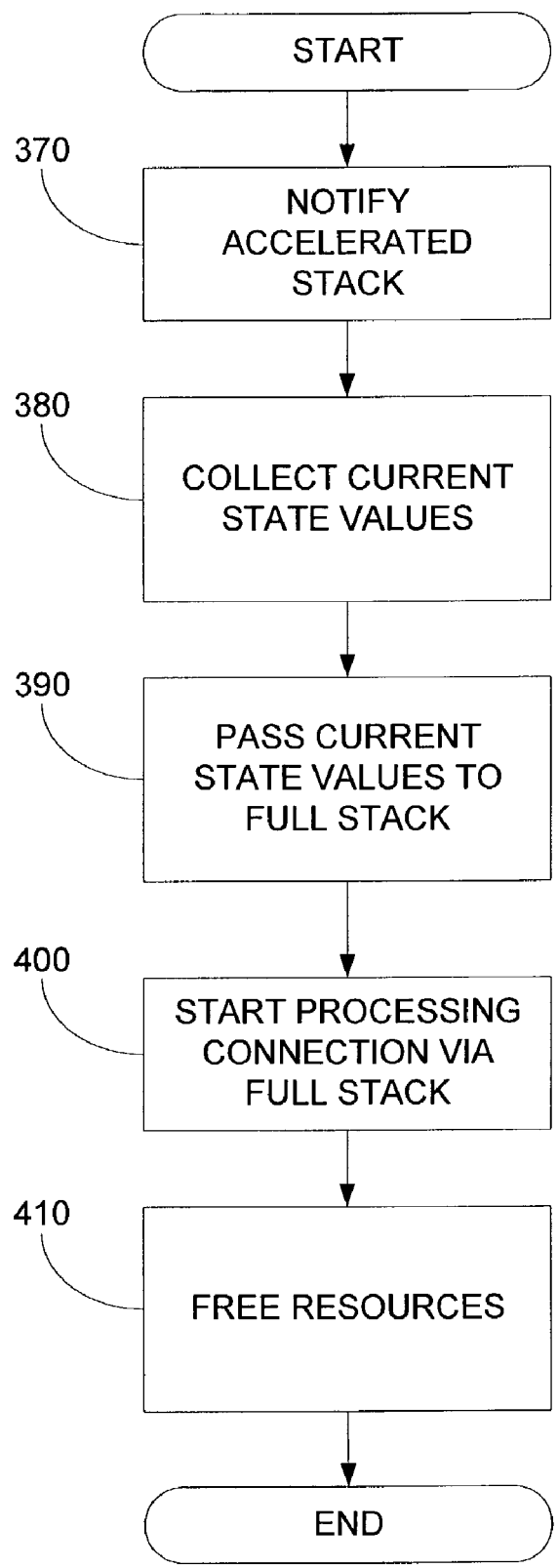
FIG. 7 shows a flow chart illustrating an embodiment of a process that uploads a connection according to the present invention.

The decision to upload a connection may be made by, for example, the software stack 90, the hardware stack 100 or a user application. Once the decision to upload has been made, a process that uploads the connection may be initiated according to the present invention. An embodiment of the process that uploads the connection is illustrated in FIG. 7. In step 370, once the decision to upload has been made, the accelerated partial stack implementation 140 may be notified. No notification may be needed if the accelerated partial stack implementation 140 was the entity that made the decision to upload. In step 380, current state values of the connection may be collected by the accelerated partial stack implementation 140. In one embodiment, once the current state values are collected, the accelerated partial stack implementation 140 may stop processing the connection. In step 390, the current state values of the connection may be passed on to the full stack implementation 130 via, for example, the path 160. When the full stack implementation 130 receives the current state values from the accelerated partial stack implementation 140, then the full stack implementation 130 may place the offload state back into its structures and, in step 400, start processing the connection. In step 410, the hardware stack 100 (e.g., the accelerated partial stack implementation 140) may free the resources previously allocated for the presently uploaded connection.

One or more embodiments of the multiple stack system according to the present invention may provide one or more of the advantages as set forth below.

In one example, the hardware stack 100 may be limited in its memory resources. However, since the memory size of the hardware stack 100 is generally smaller than the software stack 90, the hardware stack memory may be integrated with other hardware stack components into a single integrated circuit. A benefit of the smaller memory is that the memory can be accessed very quickly and may provide increase performance. The storage may be broken up by storage type so that multiple memories may be used to complete processing, in parallel, of multiple connections, thereby further enhancing performance. Memory bandwidth problems may be reduced.

Since a single TCP/IP connection may use 300 to 500 bytes of storage, support for a thousand connections may use considerable amounts of memory, especially for an integrated device. By limiting the number of offloaded connections by intelligently deciding which connections to offload, the cost of the device may be controlled and high volume markets may be addressed.

Connections that are not good candidates for offload are not offloaded. Connections such as, for example, HTTP 1.0 protocol connections may be so short that the overhead of any offload effort may result in less effective system performance. By allowing the full stack implementation 130 to continue to operate along with the hardware stack 100, these connections may be handled efficiently without decreasing the performance of the system.

The dual stack system 80 may have no hard limitations of the number of connections supported because, for example, while the heavy traffic connections are off loaded, thousands of idle connections may be tracked by the full stack implementation.

The dual stack implementation with the capability of offloading and uploading connections may provide a robust fail-over implementation. For example, when an offload adapter is not operating properly such that a connection is not progressing properly, then the connection may be uploaded to the full stack implementation 130, and possibly downloaded to another adapter supported by the system. The other adapter need not be of the same brand or even the same network type. In another example, a network interface card, which may include the hardware stack 100, may be used to indicate repeated timeouts on a particular connection as a hint to the upload-decision maker as to when to upload a connection.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A multiple stack system comprising:
   a software stack operable to process a first set of TCP packet streams; and
   a hardware stack, in parallel with and communicatively coupled to the software stack, operable to process a second set of TCP packet streams different from the first set of TCP packet streams,
   wherein the software stack is operable to offload one or more TCP connections from the software stack to the hardware stack for processing by the hardware stack instead of by the software stack,
   wherein the hardware stack is operable to upload one or more TCP connections from the hardware stack to the software stack for processing by the software stack instead of by the hardware stack, and
   wherein the software stack and the hardware stack are operable to process packets corresponding to different respective TCP connections in parallel.

2. The system according to claim 1, wherein the software stack comprises a monolithic software stack.

3. The system according to claim 2, wherein the software stack comprises an L2 network interface driver and an L2 network adapter.

4. The system according to claim 1, wherein the hardware stack comprises an accelerated partial stack.

5. The system according to claim 4, wherein the hardware stack comprises an L4 network interface driver.

6. The system according to claim 1, wherein the software stack or a user application determines whether to offload a particular connection from the software stack to the hardware stack.

7. The system according to claim 1, wherein a particular TCP connection is offloaded from the software stack to the hardware stack if the TCP connection is a long-lived connection.

8. The system according to claim 1, wherein a particular TCP connection is offloaded from the software stack to the hardware stack if the TCP connection is a high bandwidth connection.

9. The system according to claim 1, wherein a particular TCP connection is offloaded from the software stack to the hardware stack if the TCP connection can benefit from a low-latency connection.

10. The system according to claim 1, wherein a particular TCP connection is offloaded from the software stack to the hardware stack if the TCP connection can bypass processing associated with an operating system kernel.

11. The system according to claim 1, wherein the software stack, the hardware stack or a user application determines whether to upload a particular connection from the hardware stack to the software stack.

12. The system according to claim 1, wherein a particular TCP connection is uploaded from the hardware stack to the software stack if the TCP connection comprises out-of-order data.

13. The system according to claim 1, wherein a particular TCP connection is uploaded from the hardware stack to the software stack if the TCP connection repeatedly timeouts.

14. The system according to claim 1, wherein a particular TCP connection is uploaded from the hardware stack to the software stack if the TCP connection is a low bandwidth connection.

15. The system according to claim 1, wherein whether a particular TCP connection is offloaded or is uploaded is dependent upon a dynamic connection environment.

16. The system according to claim 1, wherein a particular connection can be offloaded or uploaded on the fly.

17. The system according to claim 1, wherein a particular connection can be offloaded from the software stack to the hardware stack for a first time period and then uploaded from the hardware stack to the software stack for a subsequent time period.

18. The multiple stack system of claim 1, wherein:
the software stack operates to communicatively couple a sockets interface and an Ethernet TCP/IP network; and
the hardware stack operates to communicatively couple the sockets interface and the Ethernet TCP/IP network.

19. The multiple stack system of claim 1, wherein the software stack and the hardware stack share an L2 network adapter.

20. The multiple stack system of claim 1, wherein:
the software stack comprises a first L2 network adapter; and
the hardware stack comprises an L2 network adapter that is integrated with the first L2 network adapter.

21. The multiple stack system of claim 1, wherein the hardware stack operates to upload one or more TCP connections to the software stack as a fail-over implementation.

22. The multiple stack system of claim 1, wherein a network interface card comprises the hardware stack.

23. A method for offloading and uploading in a multiple stack system, the method comprising:
processing one or more TCP connections on a software stack;
processing one or more TCP connections on a hardware stack that is in parallel with and communicatively coupled to the software stack, the processing of the hardware stack occurring concurrently with the processing of the software stack;
offloading a first TCP connection from the software stack to the hardware stack for processing by the hardware stack instead of by the software stack; and
uploading a second TCP connection from the hardware stack to the software stack for processing by the software stack instead of by the hardware stack.

24. The method according to claim 23, wherein the first TCP connection is same as second TCP connection.

25. The method according to claim 23, wherein the offloading occurs if the first TCP connection is at least one of a long-lived connection and a high bandwidth connection.

26. The method according to claim 23, wherein the offloading occurs if the first TCP connection desires a low-latency connection or can bypass a kernel.

27. The method according to claim 23, wherein the uploading occurs if the second TCP connection comprises out-of-order data.

28. The method according to claim 23, wherein the uploading occurs if the second TCP connection repeatedly timeouts or is a low bandwidth connection.

* * * * *